United States Patent [19]

Stone

[11] 4,012,632
[45] Mar. 15, 1977

[54] DISCRETE FUNCTION ADVISORY ILLUMINATION

[75] Inventor: Franklin P. Stone, Shelton, Conn.

[73] Assignee: United Technologies Corporation, Hartford, Conn.

[22] Filed: Dec. 18, 1975

[21] Appl. No.: 641,975

[52] U.S. Cl. .............................. 240/2.1; 240/8.16; 40/130 R
[51] Int. Cl.² .................. G01D 11/28; G09F 13/04
[58] Field of Search .................... 240/1.2, 2.1, 8.16, 240/9 R; 40/130 R, 130 D, 130 E, 130 N, 130 J, 130 B, 130 C, 130 F

[56] References Cited
UNITED STATES PATENTS

| 2,566,026 | 8/1951 | Hughes, Jr. | 240/8.16 |
| 2,602,036 | 7/1952 | Sullivan | 240/2.1 X |
| 2,637,802 | 5/1953 | Roper et al. | 240/2.1 X |
| 2,663,107 | 12/1953 | Moler et al. | 240/2.1 X |
| 2,827,557 | 3/1958 | Neugass | 240/2.1 |
| 2,837,628 | 6/1958 | Lamb et al. | 240/2.1 |
| 3,267,598 | 8/1966 | Olesen et al. | 240/8.16 X |

*Primary Examiner*—Edna M. O'Connor

[57] ABSTRACT

Transparent or translucent indicia associated with controls mounted on a panel are constantly backlighted with light of a first color and are selectively illuminated with light of second color to accentuate the state of the controls. The second color light will usually be of greater intensity than the first color light and will "swamp out" the first color backlighting.

12 Claims, 3 Drawing Figures

DISCRETE FUNCTION ADVISORY ILLUMINATION

The invention herein described was made in the course of or under a contract or sub-contract thereunder, with the Department of the Navy.

BACKGROUND OF THE INVENTION

1. Field of the Invention

The present invention relates to improving the ease of determining the selected state of operability of equipment. More specifically, this invention is directed to a visual display and particularly to an illuminated control panel incorporating means for accentuating the selected state of the controlled device or devices. Accordingly, the general objects of the present invention are to provide novel and improved methods and apparatus of such character.

2. Description of the Prior Art

While not limited thereto in its utility, the present invention has been found to be particularly well suited for use in an environment wherein the background illumination varies from darkness to bright sunlight. The flight deck of an aircraft is an example of such an environment. In an aircraft the state of numerous devices and subsystems are controlled by selector switches which may be located on an instrument console. The instrument console will typically be comprised of a panel of translucent or transparent material on which the selector switches, typically toggle switches of comparatively small size, will be mounted. The panel will usually be back light whereby legends or other indicia associated with each switch actuator or actuator position will be faintly visible during night time operation.

In modern high performance aircarft, and particularly during the execution of a maneuver such as landing approach, the flight crew does not have sufficient time to conduct a visual check to determine the setting of the instrument panel switches. Accordingly, flight crews are taught to "read" an instrument panel through use of their sense of tough; i.e., the instrument panel will be scanned with the fingertips to insure the proper positioning of the switches thereon. Inherent in this common practice is the possibility of incorrect "reading". Even when conditions permit visual checking, the possibility of switch handle position misinterpretation exists because of observer location with respect to the switch.

A means for accentuating the state of the switches on an instrument panel has long been desired. Such a message accentuating means should not interfere with the back illumination of the legends associated with the individual switch actuators nor should the message accentuation means constitute a distraction of the flight crew or interfere with normal operation and "reading" of the instrument panel by touch. Similarly, the message accentuation means should not require additional crew controlled actuators nor should it consume significant space. There has not been available, in the prior art, means for accentuating a message or otherwise providing a readily observable indication of the position of a controller which would meet these general requirements.

SUMMARY OF THE INVENTION

The present invention overcomes the above briefly discussed and other deficiencies and disadvantages of the prior art by providing for the discrete function advisory illumination of control panels. In accomplishing this objective the present invention comprises a selector panel, associated with a switch or switches, which is provided with translucent or transparent indicia corresponding to each switch position. This selector panel is back lighted with low intensity light, typically red light, so that all indicia can be simultaneously read. The selector panel is also provided with means, controlled by the same switch which selects or controls the devices to which the indicia on the panel applies, for directing light of a second color through the single indicia commensurate with the position of the switch actuator. This second color light, which typically will be green, will be of greater intensity than the back lighting and thus will "swamp out" the back lighting.

BRIEF DESCRIPTION OF THE DRAWING

The present invention may be better understood and its numerous objects and advantages will become apparent to those skilled in the art by reference to the accomplishing drawing wherein like reference numerals refer to like elements in the several figures and in which.

DESCRIPTION OF THE PREFERRED EMBODIMENT

As noted above, although not limited thereto in its utility, the present invention is particularly well suited for use as an illuminated control panel which enables instant and positive day or night identification by a pilot or flight crew member of the function position of a switch regardless of observer location with respect to such switch. In an aircraft there may be an array of switches, defining an instrument console, each having a control panel or panel portion associated therewith. Also, various instruments, for example navigational instruments, mounted on the aircraft flight deck will have separate control panels associated therewith. The switches on such control panels are typically toggle-type switches having two to four positions. The actuators or handles of the switches are small and will customarily move only aproximately 15° from function to function. Visual checking of these small switches is difficult and time consuming.

Figure 1:
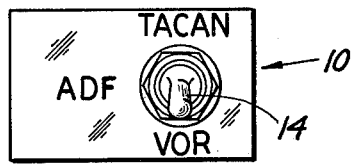
FIG. 1 is a front plan view of a control panel incorporating the present invention.

Referring to FIG. 1, a control panel associated with a selector switch for choosing which of three navigational aids will be energized is indicated generally at 10. The control panel 10 is provided with a through hole which receives a three position toggle switch 2 (see FIG. 3). Switch 12 has a handle or actuator 14 which extends outwardly from the panel 10 . Panel 10 is also provided, in the manner to be described below, with translucent or transparent indicia corresponding to each switch position and indicative of the function associated with each such switch position. In FIG. 1 the three indicia comprise the "words" TACAN, ADF and VOR.

Figure 2:
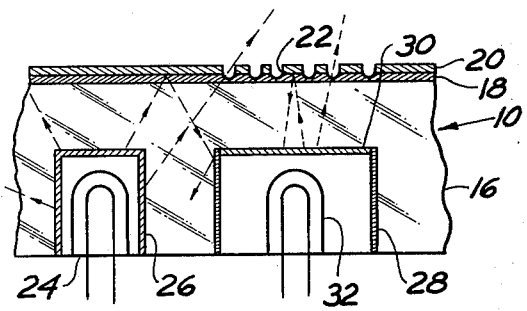
FIG. 2 is partial cross-sectional side elevation view, on an enlarged scale, of the control panel of FIG. 1.

Referring to FIG. 2, which is a partial cross-sectional view of panel 10, it may be observed that the panel is comprised of a plate 16 of transparent material. In practice plate 16 may be formed from Lucite. Plate 16 will bear, on the planar surface thereof which is to form the face of panel 10, plural coatings in the form of layers 18 and 20. In a typical example, layer 18 will comprise white paint applied to the surface of plate 16 and layer 20 will comprise black or grey paint applied over the white paint layer 18. In order to define and permit illumination of the indicia on panel 10, the black paint layer 20 will be etched away as indicated at 22 in FIG. 2 employing photo-resist techniques. Alternatively, the black paint layer 20 may be selectively applied, for example through a screen, to leave visible areas of white paint layer 18 commensurate with the desired indicia.

Continuing with a discussion of FIG. 2, the "rear" side of plate 16; that is, the side opposite to that having paint layers 18 and 20 applied thereto; is provided with a plurality of lamp receiving recesses. In accordance with a preferred embodiment, there will be a recess directly behind each indicia defined on the front surface of the panel. There will, additionally, be further recesses angularly offset from the panel indicia. The angularly offset recesses will typically, but not necessarily, be fewer in number than the number of discrete indicia on the surface of panel 10. As will be described below, the angularly offset recesses receive lamps, such as lamp 24, which provide the back lighting for the panel.

The recesses which are angularly offset with respect to the panel indicia receive, for example in the form of a press fit, optical filters such as filter 26 of FIG. 2. The filters 26 will customarily be red and will be in the form of a cap of a suitable plastic material. The lamps 24, in the case of an aircraft installation, will be conventional 5 volt pilot lamps which emit "white" light. The cap or filter 26 will be chosen so as to pass sufficient light to illuminate the indicia on panel 10 adequately to permit the reading thereof under conditions of total darkness. This red back lighting, however, will not be sufficiently intense to distract an aircraft crewman. Although the red back lighting may be provided in the form of an individual one of lamps 24 associated with each discrete word or indicia on the panel 10, it is usually adequate to employ two of lamps 24 for a three position switch such as that depicted in FIG. 1. As may be observed from FIG. 3, the back lighting lamps 24 will be energized at all times.

The recesses in plate 16 located directly behind the panel indicia receive filter-caps 28 which, like filters 26, are press fit into the recesses. The caps 28 are provided with opaque side walls whereby light will be radiated only toward the indicia in registration with the top or base portion 30 of cap 28. Portion 30 of cap 28 will pass light of a second color, for example green. This light will be supplied by a lamp 32 positioned within cap 28. As in the case of lamp 24, lamp 32 will be a standard 5 volt pilot light which emits "white" light. The cap 28, and particularly the end 30 thereof, is selected so that the light directed to the translucent indicia shall be subsequently greater, typically by a factor of ten, when compared to the intensity of the light from the angularly offset light source including lamp 24. Accordingly, in the aircraft control panel environment being described, the green light transmitted for lamp 32 via filter portion 30 will, when lamp 32 is energized, "wash" out the red light from the angularly offset back lighting source comprising lamp 24 and filter-cap 26.

Figure 3:
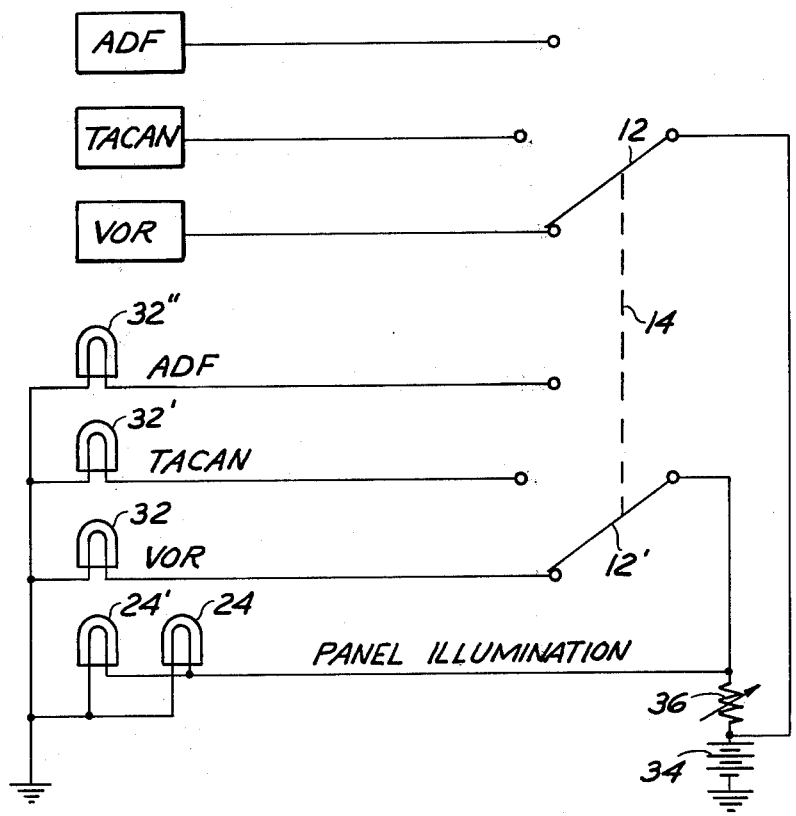
FIG. 3 is an electrical schematic view of the control panel of FIG. 1 and the controlled equipment associated therewith.

Since lamp 32 will be energized only when the arm 14 of switch 12 is in the position commensurate with energization of the equipment indicated by the indicia in registration with lamp 32, in the manner depicted in FIG. 3, it should now be obvious that all three "words" on panel 10 will be constantly illuminated with a faint red light and the word corresponding to the instantaneous switch position will additionally be illuminated with green light of significantly greater intensity than the red light. This green light, while not being sufficiently bright to illuminate the aircraft cabin or otherwise cause a distraction, will nevertheless make the position of switch 12 immediately discernable regardless of the relative position of the observer to the control panel 10.

FIG. 3 is an electrical schematic drawing which depicts the wiring for the lamps associated with panel 10. As noted above, a pair of back-lighting lamps 24, 24' will be constantly energized from a voltage source 34. The switch 12 will comprise ganged contacts whereby the lamps 32, 32' and 32'' will be independently energized at the same time the voltage source 34 is connected to the controlled equipment for enabling, through appropriate switching means, the operation of such equipment. A variable resistor 36 is included in the circuit to permit the simultaneous proportional adjustment of the intensity of lamps 24 and 32.

While a preferred embodiment has been shown and described, various modifications and substitutions may be made thereto without departing from the spirit and scope of the invention. Accordingly, it is to be understood that the present invention has been described by way of illustration and not limitation.

What is claimed is:
1. A display device comprising:
   a panel, said panel bearing a plurality of spatially displaced indicia, said panel passing light therethrough in the regions commensurate with said indicia and preventing the passage of light therethrough in other regions;
   means for back-lighting said panel indicia with light of a first color; and
   means for selectively back-lighting individual of said panel indicia with light of a second color, said second color light being of greater intensity than said first color light.
2. The display of claim 1 wherein said means for back-lighting said panel with first color light includes:
   means for generating light of a first color, said first color light generating means being angularly offset with respect to the indicia on said panel.
3. The display device of claim 2 wherein said means for illuminating said panel indicia with said second color light includes:
   means for generating light of a second color, said second color light generating means comprising a light source positioned in registration with each panel indicia.
4. The display device of claim 3 wherein the second color light generating means comprising:
   a plurality of lamps, said lamps being individually positioned generally in alignment with the panel indicia; and
   switch means for selectively energizing said lamps of said plurality.
5. The display device of claim 4 wherein said second color light generating means further comprises:

filter means positioned between each of said lamps and said panel.

6. The display device of claim 5 wherein said filter means each comprise:
an end cap, said end cap transmitting light of a first color toward said aligned panel indicia; and
opaque side walls, said opaque side walls preventing radiation of said second color light toward regions of said panel displaced from the aligned panel indicia.

7. The display device of claim 4 further comprising:
means for continuously energizing said first color light generating means.

8. The display device of claim 7 wherein said means for generating light of a first color comprises:
a second plurality of lamps; and
filter means disposed between each of said lamps of said second plurality of said panel.

9. The display device of claim 8 wherein said second color light generating means further comprises:
filter means positioned between each of said lamps and said panel.

10. The display device of claim 9 wherein said filter means each comprise:
an end cap, said end cap transmitting light of a first color toward said aligned panel indicia; and
opaque side walls, said opaque side walls preventing radiation of said second color light toward regions of said panel displaced from the aligned panel indicia.

11. The display device of claim 10 wherein said panel comprises:
a sheet of transparent material;
a coating of translucent material disposed on a first surface of said sheet; and
a discontinuous coating of opaque material disposed on said sheet over said coating of translucent material, the discontinuities in said opaque coating defining said panel indicia.

12. The display device of claim 1 wherein said panel comprises:
a sheet of transparent material;
a coating of translucent material disposed on a first surface of said sheet; and
a discontinuous coating of opaque material disposed on said sheet over said coating of translucent material, the discontinuities in said opaque coating defining said panel indicia.

* * * * *

UNITED STATES PATENT AND TRADEMARK OFFICE
CERTIFICATE OF CORRECTION

PATENT NO. : 4,012,632
DATED : March 15, 1977
INVENTOR(S) : Franklin P. Stone

It is certified that error appears in the above-identified patent and that said Letters Patent are hereby corrected as shown below:

Column 1, line 32, "light" should be --lighted--

Column 1, line 36, "aircarft" should be --aircraft--

Column 1, line 42, "tough" should be --touch--

Column 1, line 55, "of" should be --to--

Colunn 2, line 22, "accomplishing" should be --accompanying--

Column 2, line 51, after "checking" insert --of the position--

Column 2, line 57, "2" should be --12--

Column 3, line 60, "subsequently" should be --substantially--

Column 3, line 65, "for" should be --from--

Column 4, line 48, (Claim 2, line 1) after "display" insert --device--

Column 4, line 60, (Claim 4, line 1) "the" (second occurrence) should be --said--

UNITED STATES PATENT OFFICE
CERTIFICATE OF CORRECTION

Patent No. 4,012,632                Dated March 15, 1977

Inventor(s) Franklin P. Stone

It is certified that error appears in the above-identified patent and that said Letters Patent are hereby corrected as shown below:

Column 4, line 61, "comprising" should read -- comprises --.

Column 5, line 18, "of" should read -- and --.

Signed and Sealed this

Thirty-first Day of May 1977

[SEAL]

Attest:

RUTH C. MASON
*Attesting Officer*

C. MARSHALL DANN
*Commissioner of Patents and Trademarks*